(12) United States Patent
Lail et al.

(10) Patent No.: US 6,847,768 B2
(45) Date of Patent: Jan. 25, 2005

(54) OPTICAL FIBER TUBE ASSEMBLY HAVING A PLUG

(75) Inventors: Jason C. Lail, Conover, NC (US); Paul A. Larson, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 176 days.

(21) Appl. No.: 10/236,253

(22) Filed: Sep. 6, 2002

(65) Prior Publication Data

US 2004/0047573 A1 Mar. 11, 2004

(51) Int. Cl.$^7$ .................................................. G02B 6/44
(52) U.S. Cl. ......................................... 385/111; 385/100
(58) Field of Search ................................. 385/109, 111, 385/112, 114

(56) References Cited

U.S. PATENT DOCUMENTS

| 4,232,935 A | | 11/1980 | Rohner et al. | ........... 350/96.23 |
| 4,684,213 A | | 8/1987 | Ishihara et al. | ........... 350/96.23 |
| 4,701,016 A | * | 10/1987 | Gartside et al. | ............. 385/100 |
| 4,743,085 A | * | 5/1988 | Jenkins et al. | ............... 385/113 |
| 4,818,060 A | * | 4/1989 | Arroyo | ........................ 385/103 |
| 4,909,592 A | * | 3/1990 | Arroyo et al. | ............... 385/113 |
| 4,964,691 A | * | 10/1990 | Nelson et al. | ............... 385/110 |
| 5,013,127 A | * | 5/1991 | Bernard | ....................... 385/107 |
| 5,684,904 A | | 11/1997 | Bringuier et al. | ........... 385/109 |
| 5,999,684 A | | 12/1999 | Bloom | ........................ 385/137 |
| 6,151,434 A | | 11/2000 | Bonicel | ....................... 385/102 |
| 6,178,278 B1 | | 1/2001 | Keller et al. | ................. 385/109 |
| 6,226,431 B1 | | 5/2001 | Brown et al. | ................. 385/114 |
| 6,253,012 B1 | | 6/2001 | Keller et al. | ................. 385/109 |
| 2003/0044137 A1 | | 3/2003 | Lopez | |

FOREIGN PATENT DOCUMENTS

| EP | 0159575 A1 | 10/1985 | ............. G02B/6/44 |
| EP | 0325006 A1 | 7/1989 | ............. G02B/6/44 |
| JP | 61-023104 | 1/1986 | ............. G02B/6/44 |
| JP | 9-152535 | 6/1997 | ............. G02B/6/44 |
| JP | 9-243881 | 9/1997 | ............. G02B/6/44 |
| JP | 11-271581 | 10/1999 | ............. G02B/6/44 |
| JP | 11-337783 | 12/1999 | ............. G02B/6/44 |
| JP | 2001-343565 | 12/2001 | ............. G02B/6/44 |
| JP | 2001-343566 | 12/2001 | ............. G02B/6/44 |

OTHER PUBLICATIONS

Norris, R. H.; Weimann, P.A., "Dry Central Tube Ribbon Cables for the Outside Plant Environment", Proc. Of the 51$^{st}$ Intern. Wire & Cable Symposium, pp. 202–210 (2002).

Van Vickle, P., et al., "Innovative Dry Buffer Tube Design for Central Tube Ribbon Cable", Proc. Of the 2001 National Fiber Optics Engineers Conference, pp. 154–161 (2001).

Taylor, C., et al., "Effect of Water Blocking Materials On Moisture Diffusion in Prototype Cable Structures", Proc. of the 50$^{th}$ Intern. Wire & Cable Symposium, pp. 518–525 (2001).

Dixon, L., et al., "Crush and Bending Resistence in Next Generation Cable Designs", Proc. Of the 50$^{th}$ Intern. Wire & Cable Symposium, pp. 422–431 (2001).

(List continued on next page.)

*Primary Examiner*—Akm Enayet Ullah
*Assistant Examiner*—Jennifer Doan
(74) *Attorney, Agent, or Firm*—Michael E. Carroll, Jr.

(57) ABSTRACT

A fiber optic tube assembly including a tube having a longitudinal axis, at least one optical fiber, and at least one plug. The at least one optical fiber being at least partially disposed within the tube and the at least one plug being disposed within the tube at a predetermined location. A portion of the at least one optical fiber disposed within the at least one plug is capable of moving about the longitudinal axis of the tube relative to at least one plug. In other embodiments, the at least one plug includes an interfacial layer.

35 Claims, 4 Drawing Sheets

OTHER PUBLICATIONS

Wagman, R., et al., "BOTDR Analysis of Cable Tensile Testing", Proc. Of the 48$^{th}$ Intern. Wire & Cable Symposium, pp. 658–664 (1999).

Beasley, B., "Look, Mom! No Gel!" Outside Plant Magazine. Dec. 2002. pp. 16–18.

* cited by examiner

OPTICAL FIBER TUBE ASSEMBLY HAVING A PLUG

FIELD OF THE INVENTION

The present invention relates generally to fiber optic cables. More specifically, the invention relates to a fiber optic tube assembly having at least one plug.

BACKGROUND OF THE INVENTION

Fiber optic ribbons include optical waveguides such as optical fibers that transmit optical signals such as voice, video, and/or data information. Fiber optic ribbons generally have a plurality of adjacent optical fibers arranged in a generally planar array in a matrix material. Additionally, the fiber optic ribbons can be arranged as a ribbon stack for a relatively high optical fiber-density.

One optical fiber cable design employing a ribbon stack places the same into a tube filled with a thixotropic material such as grease. Thixotropic materials are used because they are effective at blocking the migration of water inside the tube. Additionally, thixotropic materials function as a friction element inhibiting substantial ribbon stack movement when the fiber optic cable is installed. However, the thixotropic materials are messy and must be removed before the craftsman can optically connect optical waveguides of the optical ribbons. Consequently, "dry tube" designs have removed the thixotropic materials from the tube, but water must still be blocked in the tube. However, conventional dry tubes have disadvantages.

An example of a conventional dry tube design is disclosed in U.S. Pat. No. 4,909,592. This patent discloses a tube having water-swellable tapes and yarns disposed therein for blocking the migration of water. One disadvantage of this design is that voids are formed between the optical fibers, the tube wall, and the water-swellable materials along the length of the tube. Consequently, these voids provide a pathway for the migration of water therealong. Additionally, dry tube designs must maintain sufficient coupling between the optical fibers and the tube wall. Dry tubes accomplish coupling by using the water-swellable materials inside the tube as a frictional element. However, effective coupling requires a substantial amount of water-swellable material that adds expense, thereby increasing cable-manufacturing costs.

SUMMARY OF THE INVENTION

The present invention is directed to a fiber optic tube assembly including a tube having a longitudinal axis, at least one optical fiber, and at least one plug. The at least one optical fiber being at least partially disposed within the tube and the at least one plug is disposed within the tube at a predetermined location. A portion of the at least one optical fiber is disposed within the at least one plug so that the portion of the at least one optical fiber disposed within the at least one plug is movable about the longitudinal axis relative to at least one plug.

The present invention is directed to a fiber optic tube assembly including a tube having a longitudinal axis, a ribbon stack, a first plug, and a second plug. The ribbon stack includes at least one optical fiber ribbon, and the ribbon stack being at least partially disposed within the tube and being rotated therein. A first plug is disposed within the tube at a first predetermined location with a portion of the ribbon stack being disposed within the first plug. The first plug generally inhibits the rotation of the ribbon stack relative to the tube at the predetermined first location. The second plug is disposed within the tube at a second predetermined location with a portion of the ribbon stack being disposed within the second plug. The second plug generally inhibits the rotation of the ribbon stack relative to the tube at the predetermined second location. Additionally, the ribbon stack has at least one-hundred and eighty degrees of rotation between the first plug and the second plug, and a portion of the ribbon stack disposed within one of the plugs is capable of moving about the longitudinal axis relative to at least one of the plugs.

The present invention is also directed to a fiber optic tube assembly including a tube having a longitudinal axis, at least one optical fiber, and at least one plug. The at least one optical fiber is at least partially disposed within the tube and the at least one plug is disposed within the tube at a predetermined location. The plug includes an interfacial layer and a portion of the at least one optical fiber is disposed within the plug. The portion of the at least one optical fiber disposed within the at least one plug is movable relative to the at least one plug.

DETAILED DESCRIPTION OF THE INVENTION

Figure 1:
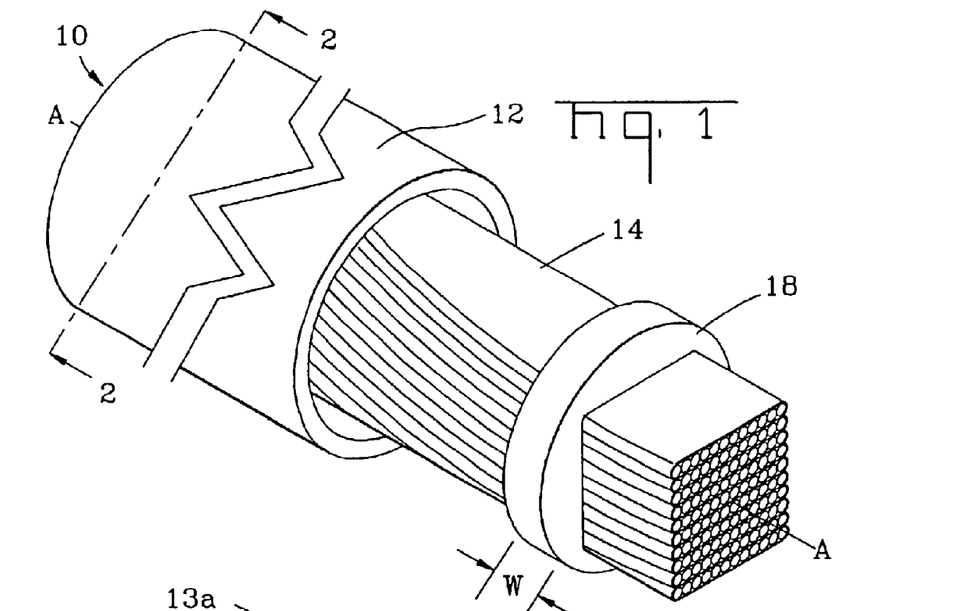
FIG. 1 is a perspective view of a fiber optic tube assembly according to the present invention.
Figure 2:
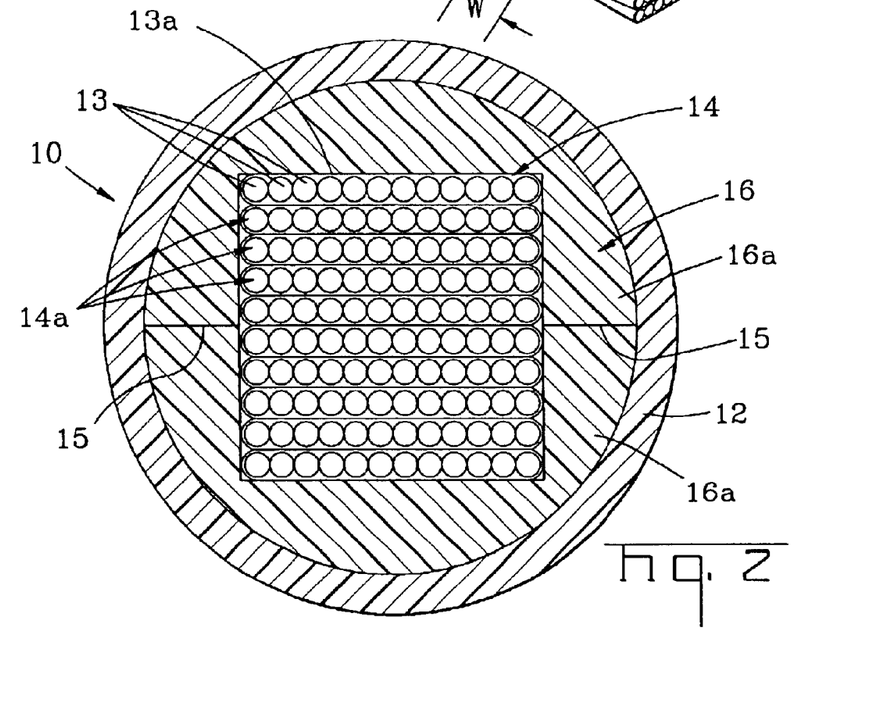
FIG. 2 is a cross-sectional view along line 2—2 of the fiber optic tube assembly of FIG. 1.

Illustrated in FIGS. 1 and 2 is an exemplary section of fiber optic tube assembly 10 that includes a tube 12, at least one optical fiber, for instance, a ribbon stack 14, and at least one plug. The plugs of the present invention are discrete plugs that are individually locatable so that the tube assembly has sections without a portion of a plug assembly, rather than requiring a water swellable tape having plugs attached thereto and surrounding the same. Tube 12 has a longitudinal axis A—A extending along its length and a first plug 16 (not visible in FIG. 1) and a second plug 18 that are operable to inhibit the migration of water along tube 12. Ribbon stack 14 is at least partially disposed within tube 12 and is twisted therein with a predetermined lay length during manufacture. First plug 16 is disposed within tube 12 at a first predetermined location and second plug 18 is disposed within tube 12 at a second predetermined location with successive plugs following as needed. A portion of ribbon stack 14 is disposed within first and second plugs 16,18. First and second plugs 16,18 generally inhibit the rotation of the ribbon stack relative to the tube at the respective predetermined first and second locations, and successive locations as desired. Tube assembly 10 can be used as a portion of a fiber optic cable such as mono-tube or stranded tube configurations. In one embodiment, ribbon stack 14 has at least one-hundred and eighty degrees of twist between first plug 16 and second plug 18. Additionally, a portion of ribbon stack 14 disposed within one of the plugs 16,18 is capable of moving about longitudinal axis A—A relative to the plugs 16,18. Allowing movement of a portion of ribbon stack 14 disposed within one of the plugs 16,18 allows tube assembly 10 to advantageously withstand bending without experiencing undesirable levels of optical attenuation.

Tube 12 is preferably constructed of a polymeric material and is suitably dimensioned for receiving the ribbon stack therein. However, other suitable materials and shapes can be used for tube 12. Tube 12 of the present invention can include additives for improving flame-retardance; however, any other suitable additives can be used. Additionally, tube 12 can be, for example, extruded as a continuous unit or be manufactured from one or more polymeric flat tapes that are formed and sealed, thereby forming a tube. Tube 12 can also include an indicia 12a thereon for marking the locations of plugs 16,18 or for other purposes. Additionally, tube 12 can have other suitable components or features such as a water-swellable material thereon or a ripcord.

Ribbon stack 14 includes a plurality of optical fiber ribbons 14a (hereinafter ribbons). Ribbon stack 14 has a lay length in the range of about 200 mm to about 1500 mm; however, any other suitable lay length can be used. In one embodiment, the interface between a pair of ribbons 14a includes a prewet layer (not shown), thereby reducing friction between adjacent optical fiber ribbons. In other embodiments, ribbons 14 such as those disclosed in U.S. patent application Ser. No. 10/159,730 filed on May 31, 2002 and U.S. patent application filed on Jun. 28, 2002, which are incorporated by reference, can be used. Each ribbon 14a includes a plurality of optical fibers 13 disposed in a matrix material 13a. In one embodiment, optical fibers 13 are a plurality of single-mode optical fibers; however, other types or configurations of optical fibers can be used. For example, optical fibers 13 can be multi-mode, pure-mode, erbium doped, polarization-maintaining fiber, other suitable types of light waveguides, and/or combinations thereof. For instance, each optical fiber 13 can include a silica-based core that is operative to transmit light and is surrounded by a silica-based cladding having a lower index of refraction than the core. Additionally, one or more coatings can be applied to optical fiber 13. For example, a soft primary coating surrounds the cladding, and a relatively rigid secondary coating surrounds the primary coating. The coating can also include an identifying means such as ink or other suitable indicia for identification and/or an anti-adhesion agent that inhibits the removal of the identifying means. Suitable optical fiber ribbons are commercially available from Corning Cable Systems LLC of Hickory, N.C.

Additionally, ribbon stack 14 can be formed from subgroups of optical fiber ribbons defining a step-like profile as disclosed in U.S. Pat. No. 6,192,178, which is incorporated herein by reference. However, any other suitable cross-sectional shapes of ribbon stack 14 can be used such as rectangular or square. Furthermore, the concepts of the present invention can be practiced with optical waveguides having configurations other than ribbons, for example, bundled or loose optical fibers. Moreover, the optical waveguides do not require rotation within the tube.

Figure 4:
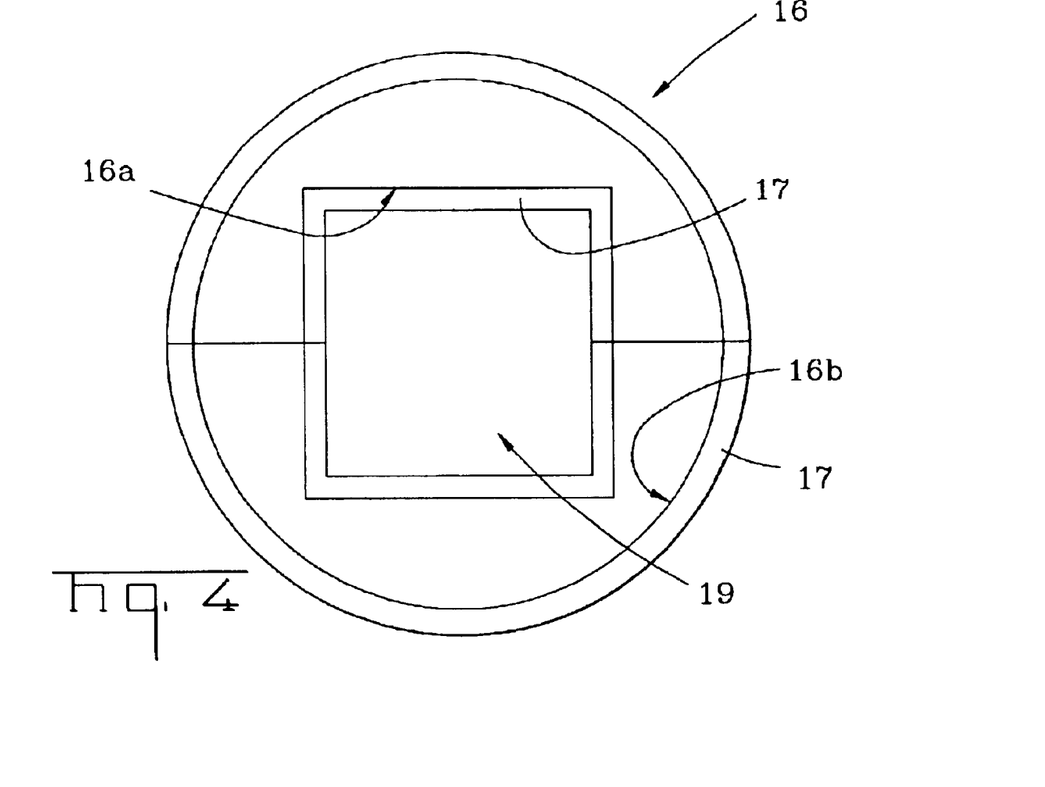
FIG. 4 is a front view of the plug of FIG. 1.

First plug 16 and second plug 18 have a passage 19 therethrough, which can be shaped into various configurations. Additionally, plugs of the present invention are generally formed of solid materials, rather than consisting essentially of thixotropic materials such as grease. In one embodiment, passage 19 is generally shaped to conform to the shape of ribbon stack 14, thereby inhibiting the stack from relatively large angles of twist relative to the plug (FIG. 4). On the other hand, first and second plugs 16,18 are intended to allow the ribbon stack 14 and/or individual ribbons 14a disposed within the plugs to move relative to the respective plug about a longitudinal axis A—A of tube 12 as needed. Allowing movement of ribbon stack 14 and/or individual ribbons 14a disposed within the plugs advantageously inhibits stress and/or strain on the optical fibers, for example, during bending of tube assembly 10. Additionally, the plug material used, preferably, has a coefficient of thermal expansion (CTE) that is similar to the CTE of tube 12; however, the CTEs between the two materials can vary.

In another embodiment, a material for the plug is selected to allow ribbon stack 14 to twist within the plug, while still inhibiting the migration of water and inhibiting stress and/or strain. Plugs allowing twist can be formed from a relatively soft material and can have a width that is less than about 25% of the lay length. In another embodiment, passage 19 can be slightly larger than one or more dimensions of the ribbon stack, thereby allowing the ribbon stack to have some freedom to migrate in a direction perpendicular to the longitudinal axis of the cable.

Figure 3:
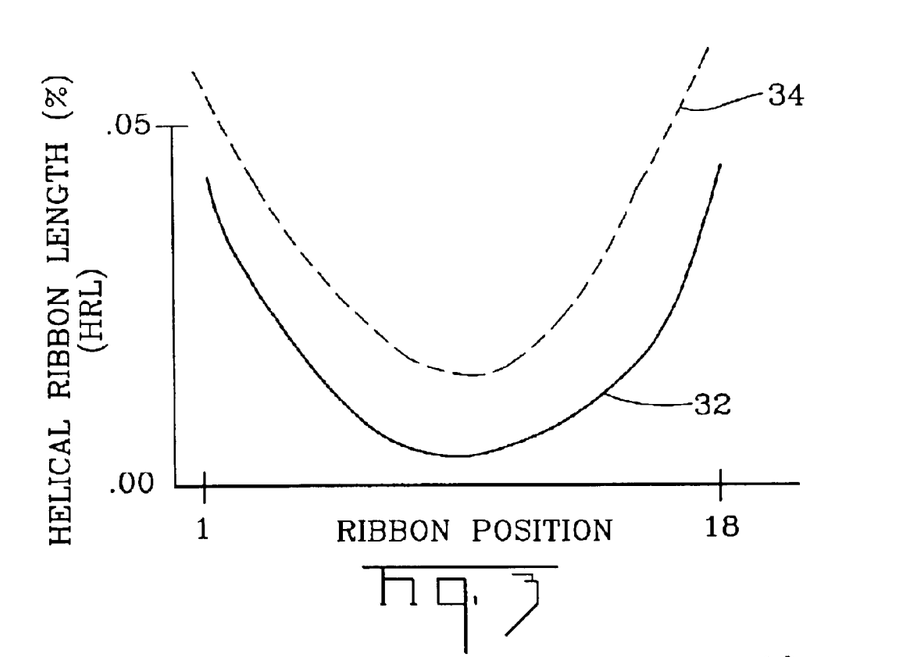
FIG. 3 is a graph depicting contours of a helical ribbon length of a plurality of optical fiber ribbons of a ribbon stack.

As used herein, helical ribbon length (HRL) means the excess length of an individual ribbon 14a with respect to the length of tube 12 and is generally expressed as a percentage (%). FIG. 3 illustrates contours of HRL for eighteen ribbons of a ribbon stack having a predetermined lay length. The ribbons are numbered from one at the top of the ribbon stack to eighteen at the bottom of the ribbon stack. Because ribbon stack 14 has a lay length such as a helical twist within tube 12, the individual ribbons 14a of ribbon stack 14 have slightly different lengths with respect to tube 12. Curve 32 illustrates the HRL values for ribbon 14a when tube assembly 10 is laid in a straight length. In other words, the ribbons in positions one and eighteen must have the greatest HRL to accommodate the twist because they travel the greatest distance in the helically twisted stack. On the other hand, ribbons in positions nine and ten require a lower HRL to accommodate the twist. However, the HRL for ribbon stack 14 is dynamic over a predetermined length of tube assembly 10, rather than static.

Twist tightening of ribbon stack 14 is defined as the reduction of lay length for a portion of ribbon stack 14 as the bending radius of tube assembly 10 is decreased. For example, ribbon stack 14 of tube assembly 10 can be manufactured with a lay length of 600 mm with first and second plugs 16,18 at a distance of one lay length apart. Thus, when tube assembly 10 is laid straight, where stresses on ribbon stack 14 are at a minimum, the twist rate of ribbon stack 14 is generally constant, thereby making one revolution in 600 mm. However, if the same tube assembly is bent to a predetermined radius, the twist rate between first and second plugs 16,18 is no longer constant. Stated another way, ribbon stack 14 is placed into a higher stress state where the twist tightens about the predetermined bend radius. For instance, one revolution of ribbon stack 14 occurs in 400 mm between the first and second plugs 16,18, as the remaining portion of ribbon stack 14 generally lays without a twist. To accommodate this twist tightening, individual ribbons 14a of ribbon stack 14 disposed within the plugs must be allowed to move relative to first and second plugs 16,18 and/or each other. Curve 34 illustrates the dynamic characteristics of ribbons 14a after tube assembly 10 is bent into a predetermined radius for the twisted portion of ribbon stack 14. As shown, the HRL for individual ribbons 14a generally increases for the twisted portion of ribbon stack 14 after being bent. More specifically, ribbons in positions one and eighteen generally have the greatest increase in HRL. To accommodate the dynamic ribbon stack, the present invention allows for ribbons 14a and/or ribbon stack 14 disposed within the plugs to move about the longitudinal axis of tube 12 relative to at least one plug, while still providing effective water-blocking.

FIG. 4 depicts first plug 16, which is similar to second plug 18, however, plugs 16,18 may have different constructions. Plug 16 can be formed from any suitable material having a suitable width W, for example, polymeric materials such as thermoplastics or thermosets, rubber-based materials, cellular foam, neoprene, silicone, metals, reinforced plastics, combinations thereof, or any other suitable materials. In other embodiments, plug 16 can have an interfacial layer or coating 17 on a surface thereof. For example, the interfacial layer can be disposed on the passage through the plug; however, other suitable surfaces of the plug can have the interfacial layer. Interfacial layer 17 can have one or more functions such as water-blocking or allowing sliding contact between ribbon stack 14 and the plug. For instance, inner surface 16a can have a water-swellable interfacial layer such as a tape or a powder for inhibiting water from passing by ribbon stack 14 and inner surface 16a; however, interfacial layer 17 on surface 16a should also permit movement of ribbon stack 14 longitudinally relative to plug 16. In another embodiment, interfacial layer 17 on surface 16a is formed from a lubricant such as grease or Teflon® based coating having at least one water-swellable material disposed therein. Likewise, outer surface 16b of plug 16 can also have a water-swellable interfacial layer 17 for inhibiting water from passing by ribbon stack 14 and outer surface 16b. However, interfacial layer 17 can be formed from any other suitable materials such as an adhesive disposed on outer surface 16b. An adhesive secures the plug to tube 12 and also inhibits water from passing by plug 16 and an inner wall of tube 12. In other embodiments, plug 16 can be secured by partially embedding it into tube 12.

Figure 5:
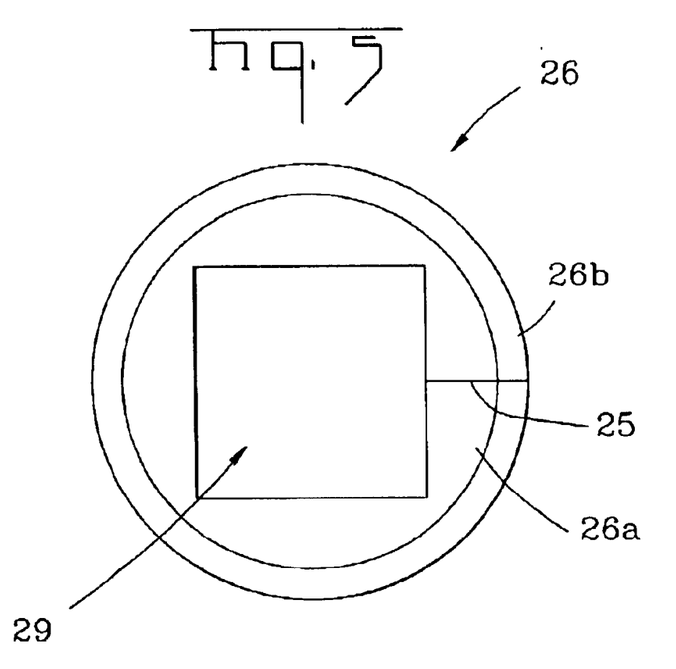
FIG. 5 is a front view of a plug according to another embodiment of the present invention.

FIG. 5 illustrates another plug 26 according to the concepts of the present invention that is similar to plug 16. Plug 26 is a composite plug formed from at least two materials, for example, a first element 26a and a second element 26b having different material characteristics. Thus, plug 26 can be tailored to the requirements of the application. For instance, first element 26a can be formed from a relatively soft material having a Shore A hardness of about 35 or less to seal around and/or cushion ribbon stack 14; however, materials having other suitable hardness values can be used. On the other hand, second element 26b can be formed from a relatively harder material. In addition, other combinations of material properties can also be used for first and second elements 26a and 26b. For instance, one of the elements can have a water-swellable powder embedded therein, resiliency, shape memory, and/or any other suitable properties.

Figure 8:
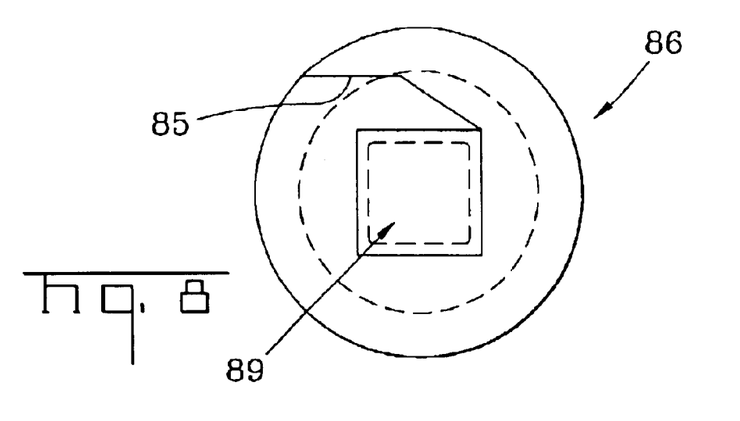
FIG. 8 is a front view of a plug according to another embodiment of the present invention.

The plugs can be formed from one or more sections. As shown in FIG. 2, plug 16 is formed from two sections 16a. Sections 16a can be secured together at seams 15 with, for example, an adhesive or they can have a friction fit, thereby blocking the migration of water past the seam. In other embodiments, the plug can have a single seam 25 as shown in FIG. 5, or no seams. FIG. 8 depicts another embodiment according to the present invention. Plug 86 is similar to plug 16, but has one seam 85 with more than one surface. Additionally, the plug is larger than the tube diameter so that when the plug is installed it is compressed. The dashed lines depict the installed dimensions. Likewise, passage 89 does not conform to the shape of the ribbon stack passing therethrough, but rather is compressed to conform to the shape of the ribbon stack, thereby inhibiting the migration of water.

Figure 6:
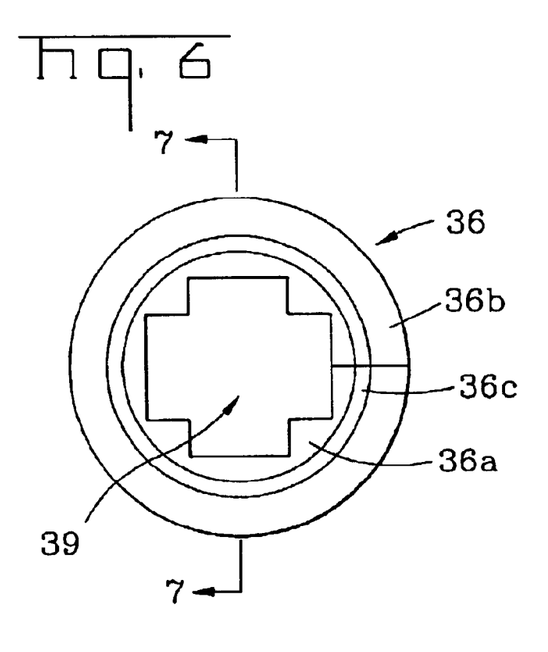
FIG. 6 is a front view of a plug according to another embodiment of the present invention.
Figure 7:
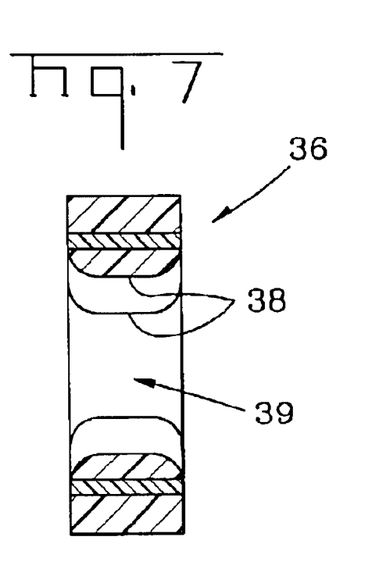
FIG. 7 is a cross-sectional view along line 7—7 of the plug of FIG. 6.

FIGS. 6 and 7 illustrate another plug 36 according to the concepts of the present invention. Plug 36 has a passage 39 therethrough that is shaped to accommodate a non-rectangular shaped ribbon stack. Additionally, plug 36 is formed from a first element 36a and a second element 36b with an interfacial layer 36c therebetween. In one embodiment, interfacial layer 36c is a water-absorbing material. Thus, if water contacts interfacial layer 36c it swells, thereby applying radial pressure against the first and second elements 36a and 36b, thereby helping to inhibit the migration of water thereby. The pressure applied to the first and second elements assists in sealing the elements to the tube wall and/or optical waveguides to inhibit the migration of water past the plug. Additionally, other suitable materials and/or dimensions can be used for interfacial layer 36c. Furthermore, FIG. 7 depicts a generally round contour 38 of passage 39. Round contour 38 can reduce the stresses on the optical waveguides of the ribbon stack when the fiber optic cable is bent, thereby inhibiting optical attenuation.

Plugs according to the present invention can be formed and placed within tube 12 by any suitable method. For example, plugs can be cut from a continuous length of material and attached to a portion of tube assembly during manufacture. Plugs can also be formed by injecting a plug material. Additionally, the tube wall can be thicker adjacent to the plug locations, thereby aiding in sealing the outermost radial portion of the plug with the tube wall. One way of accomplishing this variable wall thickness is by moving the tip relative to the die during extrusion of the tube.

Figure 9:
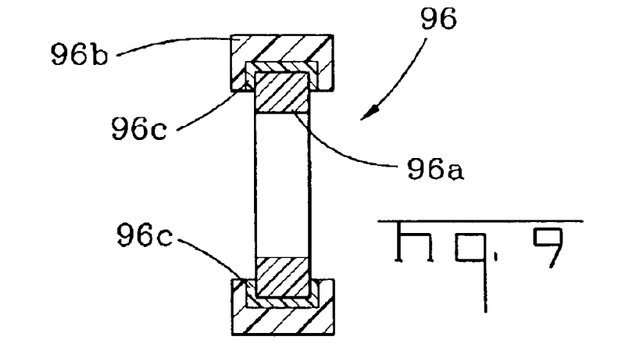
FIG. 9 is a cross-sectional view of a plug according to another embodiment of the present invention.
Figure 10:
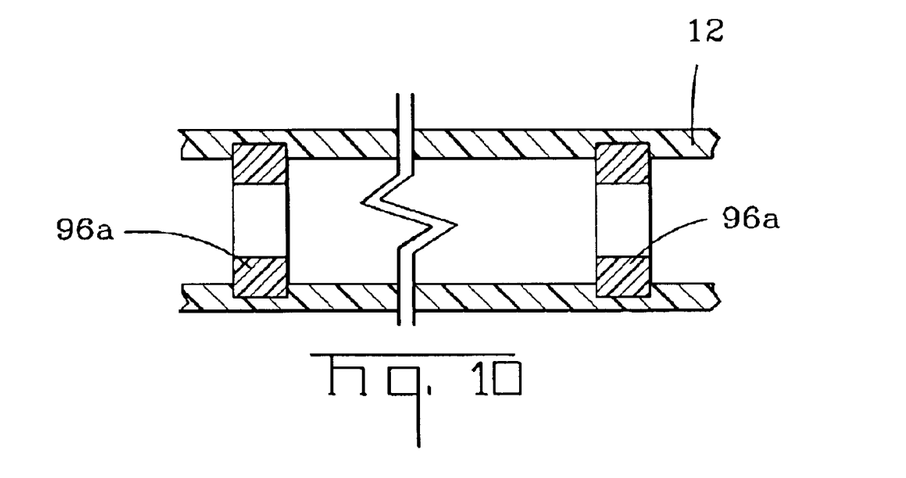
FIG. 10 is a cross-sectional view of a plug according to another embodiment of the present invention.

FIG. 9 illustrates another plug 96 according to the concepts of the present invention. First element 96a is able to rotate with respect to second element 96b, thereby allowing the ribbon stack to move and/or rotate into a low-stress position, while still blocking the migration of water beyond the plug. Protrusions 92 of second element 96b extend radially inward and form a raceway that generally inhibits excessive longitudinal movement of first element 96a. However, the spacing between protrusions 92 can be selected to allow some longitudinal movement between element 96a and 96b before element 96a contacts a protrusion. Additionally, an interfacial layer 96c can be used between first element 96a and second element 96b such as a lubricant to reduce the friction between the same. Moreover, interfacial layer 96c can have a water-swellable component to inhibit the migration of water. Alternatively, a lubricant such as a Teflon® based material can be embedded or coated on a surface of first element 96a, second element 96b, or both. FIG. 10 depicts an embodiment similar to FIG. 9, expect that first element 96a is disposed in the tube wall and able to rotate with respect to tube 12. Additionally, first element 96a can be manufactured so that it can be rotated from outside the tube assembly. For example, a portion of first element 96a can be metallic, thereby allowing a magnet at the proper located to rotate first element 96a and the optical fibers passing therethrough.

Many modifications and other embodiments of the present invention, within the scope of the appended claims, will become apparent to a skilled artisan. For example, optical fiber ribbons can include different numbers of optical fibers, ribbons can have one or more subunits, or the ribbons can have other suitable configurations. Additionally, ribbons or ribbon stacks of the present invention can include other suitable components such as a strength member. Likewise, the tube can include other suitable components such as embedded strength elements. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical fibers, but the inventive concepts of the present invention are applicable to other suitable optical waveguides as well.

That which is claimed:

1. A fiber optic tube assembly comprising:
a tube, the tube having a longitudinal axis;
at least one optical fiber, the at least one optical fiber being at least partially disposed within the tube; and
at leant one plug for inhibiting the migration of water inside the tube, the at least one plug being disposed within the tube at a predetermined location and generally fills the cross-sectional area of the tube not occupied by the at least one optical fiber, a portion of the at leant one optical fiber being disposed within said at least one plug, wherein the portion of the at least one optical fiber disposed within the at least one plug is movable about the longitudinal axis relative to at least one plug.

2. The fiber optic tube assembly of claim 1, the at least one plug further comprising an interfacial layer.

3. The fiber optic tube assembly of claim 1, the at least one plug being formed from an element having a water-swellable component.

4. The fiber optic tube assembly of claim 1, the at least one plug being formed from a first element and a second element.

5. The fiber optic tube assembly of claim 4, the first element and the second element having different material characteristics.

6. The fiber optic tube assembly of claim 4, the first element being rotatable with respect to the second element.

7. The fiber optic tube assembly of claim 1, the at least one plug being formed from a material selected from the group consisting of a thermoplastic, a thermoset, a rubber-based material, a cellular foam, a neoprene, metal, and a silicone.

8. The fiber optic tube assembly of claim 1, a material the at least one plug having a Shore A hardness of about 35 or less.

9. The fiber optic tube assembly of claim 1, the tube having an indicia thereon for marking at least one of the predetermined locations.

10. The fiber optic tube assembly of claim 1, the tube assembly being a portion of a fiber optic cable.

11. The fiber optic tube assembly of claim 1, the at least one plug being formed from a first element and a second element, and an interfacial layer disposed between the first element and the second element.

12. The fiber optic tube assembly of claim 1, the at least one plug being secured to the tube.

13. A fiber optic tube assembly comprising:
a tube, the tube having a longitudinal axis;
a ribbon stack, the ribbon stack comprising at least one optical fiber ribbon, and the ribbon stack being at least partially disposed within the tube and being rotated therein;
a first plug, the first plug being disposed within the tube at a first predetermined location, a portion of the ribbon stack being disposed within the first plug, the first plug generally inhibiting the rotation of the ribbon stack relative to the tube at the predetermined first location; and
a second plug, the second plug being disposed within the tube at a second predetermined location, a portion of the ribbon stack being disposed within the second plug, the second plug generally inhibiting the rotation of the ribbon stack relative to the tube at the predetermined second location, wherein the ribbon stack has at least one-hundred and eighty degrees of rotation between the first plug and the second plug, and wherein a portion of the ribbon stack disposed within one of the plugs is capable of moving about the longitudinal axis relative to at least one of the plugs.

14. The fiber optic tube assembly of claim 13, one of the plugs further comprising an interfacial layer.

15. The fiber optic tube assembly of claim 13, one of the plugs being formed from an element having a water-swellable component.

16. The fiber optic tube assembly of claim 13, one of the plugs being formed from a first element and a second element.

17. The fiber optic tube assembly of claim 16, the first element and the second element having different material characteristics 18. The fiber optic tube assembly of claim 16, the first element being rotatable with respect to the second element.

19. The fiber optic tube assembly of claim 13, one of the plugs being formed from a material selected from the group consisting of a thermoplastic, a thermoset, a rubber-based material, a cellular foam, a neoprene, metal, and a silicone.

20. The fiber optic tube assembly of claim 13, the tube having an indicia thereon for marking at least one of the predetermined locations.

21. The fiber optic tube assembly of claim 13, the tube assembly being a portion of a fiber optic cable.

22. The fiber optic tube assembly of claim 13, one of the plugs being formed from a first element and a second element, and an interfacial layer disposed between the first element and the second element.

23. The fiber optic tube assembly of claim 13, the ribbon stack having at least three-hundred and sixty degrees of rotation between the first plug and the second plug.

24. The fiber optic tube assembly of claim 13, the ribbon stack having a lay length in the range of about 200 mm to about 1500 mm.

25. The fiber optic tube assembly of claim 13, one of the plugs being secured to the tube.

26. A fiber optic tube assembly comprising:
a tube, the tube having a longitudinal axis;
at least one optical fiber, the at least one optical fiber being at least partially disposed within the tube;
at least one plug for inhibiting the migration of water inside the tube, the at least one plug being disposed within the tube at a predetermined location and generally fills the cross-sectional area of the tube not occupied by the at least one optical fiber, a portion of the at least one optical fiber being disposed within the plug, the at least one plug having an interfacial layer, wherein the portion of the at least one optical fiber disposed within the at least one plug is movable relative to the at least one plug.

27. The fiber optic tubs assembly of claim 26, the at least one plug being formed from an element having a water-swellable component.

28. The fiber optic tube assembly of claim 26, the at least one plug being formed from a first element and a second element.

29. The fiber optic tube assembly of claim 28, the first element and the second element having different material characteristics.

30. The fiber optic tube assembly of claim 28, the first element being rotatable with respect to the second element.

31. The fiber optic tube assembly of claim 26, the at least one plug being formed from a material selected from the group consisting of a thermoplastic, a thermoset, a rubber-based material, a cellular foam, a neoprene, metal, and a silicone.

32. The fiber optic tube assembly of claim 26, a material the at least one plug having a Shore A hardness of about 35 or lens.

33. The fiber optic tube assembly of claim 26, the tube assembly being a portion of a fiber optic cable.

34. The fiber optic tube assembly of claim 26, the at least one plug being formed from a first element and a second element, and an interfacial layer disposed between the first element and the second element.

35. The fiber optic tube assembly of claim 26, the at least one plug being secured to the tube.

* * * * *